US012770102B2

(12) United States Patent
Zhong et al.

(10) Patent No.: US 12,770,102 B2
(45) Date of Patent: Oct. 20, 2026

(54) METHOD AND APPARATUS FOR CONTROLLING ITEM INVENTORY, AND DEVICE AND MEDIUM

(71) Applicant: Beijing Jingdong Zhenshi Information Technology Co., Ltd., Beijing (CN)

(72) Inventors: Bingjie Zhong, Beijing (CN); Zhenyu Gao, Beijing (CN); Xiaotian Zhuang, Beijing (CN); Shengnan Wu, Beijing (CN)

(73) Assignee: Beijing Jingdong Zhenshi Information Technology Co., Ltd., Beijing (CN)

( * ) Notice: Subject to any disclaimer, the term of this patent is extended or adjusted under 35 U.S.C. 154(b) by 183 days.

(21) Appl. No.: 18/710,142

(22) PCT Filed: Nov. 15, 2022

(86) PCT No.: PCT/CN2022/131900
§ 371 (c)(1),
(2) Date: May 14, 2024

(87) PCT Pub. No.: WO2023/093567
PCT Pub. Date: Jun. 1, 2023

(65) Prior Publication Data
US 2025/0005520 A1 Jan. 2, 2025

(30) Foreign Application Priority Data
Nov. 25, 2021 (CN) ......................... 202111413044.3

(51) Int. Cl.
*G06Q 10/00* (2026.01)
*G06Q 10/0875* (2023.01)

(52) U.S. Cl.
CPC ................................ *G06Q 10/0875* (2013.01)

(58) Field of Classification Search
CPC ......... G06Q 10/0875; G06Q 10/06315; G06Q 10/08; G06Q 10/087; G06F 16/2474
(Continued)

(56) References Cited

U.S. PATENT DOCUMENTS

2003/0126103 A1 7/2003 Chen et al.
2012/0323744 A1* 12/2012 Jacoby ............ G06Q 10/06315 705/28
(Continued)

FOREIGN PATENT DOCUMENTS

CN 108596540 A 9/2018
CN 109840734 A 6/2019
(Continued)

OTHER PUBLICATIONS

European Search Report for corresponding EP22897650.2 dated Aug. 1, 2025.
(Continued)

*Primary Examiner* — Rokib Masud
(74) *Attorney, Agent, or Firm* — K&L Gates LLP

(57) ABSTRACT

A method for controlling item inventory includes: for each to-be-processed item, determining a replenishment attribute value of a current to-be-processed item based on a current time and shipment quantity-associated information of the current to-be-processed item; in response to detecting that a target to-be-processed item whose replenishment attribute value is greater than a preset replenishment attribute threshold, determining a target inventory quantity of the target to-be-processed item based on the replenishment attribute value of the target to-be-processed item and a target inventory quantity determination model; and for each target to-be-processed item, determining a target replenishment quantity of a current target to-be-processed item based on the target inventory quantity and a net inventory quantity
(Continued)

corresponding to the current time of the current target to-be-processed item.

16 Claims, 6 Drawing Sheets

(58) Field of Classification Search
USPC ............................................................ 705/29
See application file for complete search history.

(56) References Cited

U.S. PATENT DOCUMENTS

| | | | | |
|---|---|---|---|---|
| 2016/0283881 | A1 | 9/2016 | He et al. | |
| 2018/0218314 | A1* | 8/2018 | Bowman | G06Q 10/087 |
| 2019/0138976 | A1* | 5/2019 | Essenmacher | G06Q 10/087 |

FOREIGN PATENT DOCUMENTS

| | | | |
|---|---|---|---|
| CN | 110363454 | A | 10/2019 |
| CN | 111242524 | A | 6/2020 |
| CN | 111429048 | A | 7/2020 |
| CN | 112347417 | A | 2/2021 |
| CN | 112561414 | A | 3/2021 |
| CN | 113128932 | A | 7/2021 |
| CN | 113449939 | A | 9/2021 |
| CN | 113537861 | A | 10/2021 |
| CN | 113837706 | A | 12/2021 |

OTHER PUBLICATIONS

Chinese First Office Action dated Jan. 12, 2022 for Chinese Application No. 202111413044.3.

Chinese Second Office Action for Chinese Application No. 202111413044.3; no date.

PCT International Search Report dated Jan. 20, 2023, for International Patent Application No. PCT/CN2022/131900.

* cited by examiner

METHOD AND APPARATUS FOR CONTROLLING ITEM INVENTORY, AND DEVICE AND MEDIUM

CROSS-REFERENCE TO RELATED APPLICATIONS

This patent application is a 35 U.S.C. § 371 National Stage filing based on International Application No. PCT/CN2022/131900, filed on Nov. 15, 2022, which application claims priority benefit to Chinese Patent Application No. 202111413044.3, filed with the China National Intellectual Property Administration (CNIPA) on Nov. 25, 2021, the contents of which are is incorporated herein by reference in their entireties.

FIELD

The present disclosure relates to the field of computer technology, for example, to a method for controlling item inventory, an apparatus for controlling item inventory, a device and a medium.

BACKGROUND

In order to meet users' needs for different items, each item will have a certain inventory. The inventory of each item is determined randomly. For example, when the inventory of an item is checked at a time to be less than a preset threshold, the corresponding item is obtained; or a certain quantity of items are obtained and stored at a certain interval.

The above methods have issues as follows.

Users have different demands for different items, and correspondingly, the inventory demands corresponding to different items are also different. Therefore, for different items, there should be a certain difference between their inventories, and the inventories should match the demands for the items.

However, the inventories of different items in the above methods are randomly determined, and the target inventories of most items are the same, so there are issues of high inventory costs and a shortage of item supply.

SUMMARY

A method for controlling item inventory, an apparatus for controlling item inventory, a device and a medium are provided according to the present disclosure, to achieve the technical effect of effectively controlling inventory costs.

In a first aspect, a method for controlling item inventory is provided according to the present disclosure, the method includes as follows.

For each to-be-processed item, a replenishment attribute value of a current to-be-processed item is determined based on a current time and shipment quantity-associated information of the current to-be-processed item.

In response to detecting that a target to-be-processed item whose replenishment attribute value is greater than a preset replenishment attribute threshold, a target inventory quantity of the target to-be-processed item is determined based on the replenishment attribute value and a target inventory quantity determination model.

For each target to-be-processed item, a target replenishment quantity of a current target to-be-processed item is determined based on the target inventory quantity and a net inventory quantity corresponding to the current time of the current target to-be-processed item.

In a second aspect, an apparatus for controlling item inventory is further provided according to the present disclosure, which includes: a collection and calculation module, an inventory strategy operation module and a result output module.

The collection and calculation module is configured to, for each to-be-processed item, determine a replenishment attribute value of a current to-be-processed item based on a current time and shipment quantity-associated information of the current to-be-processed item.

The inventory strategy operation module is configured to, in response to detecting that at least one target to-be-processed item whose replenishment attribute value is greater than a preset replenishment attribute threshold, determine a target inventory quantity of the at least one target to-be-processed item based on the replenishment attribute value and a target inventory quantity determination model.

The result output module is configured to, for each target to-be-processed item, determine a target replenishment quantity of the target to-be-processed item based on the target inventory quantity and a net inventory quantity corresponding to the current time of the target to-be-processed item.

In a third aspect, an electronic device is further provided according to the present disclosure, which includes:

- one or more processors; and
- a storage apparatus configured to store one or more programs.

When the one or more programs are executed by the one or more processors, the one or more processors are caused to implement the method for controlling item inventory described above.

In a fourth aspect, a storage medium storing a computer-executable instruction is further provided according to the present disclosure. The computer-executable instruction, when being executed by a computer processor, is used to perform the method for controlling item inventory described above.

DETAILED DESCRIPTION

Figure 1:
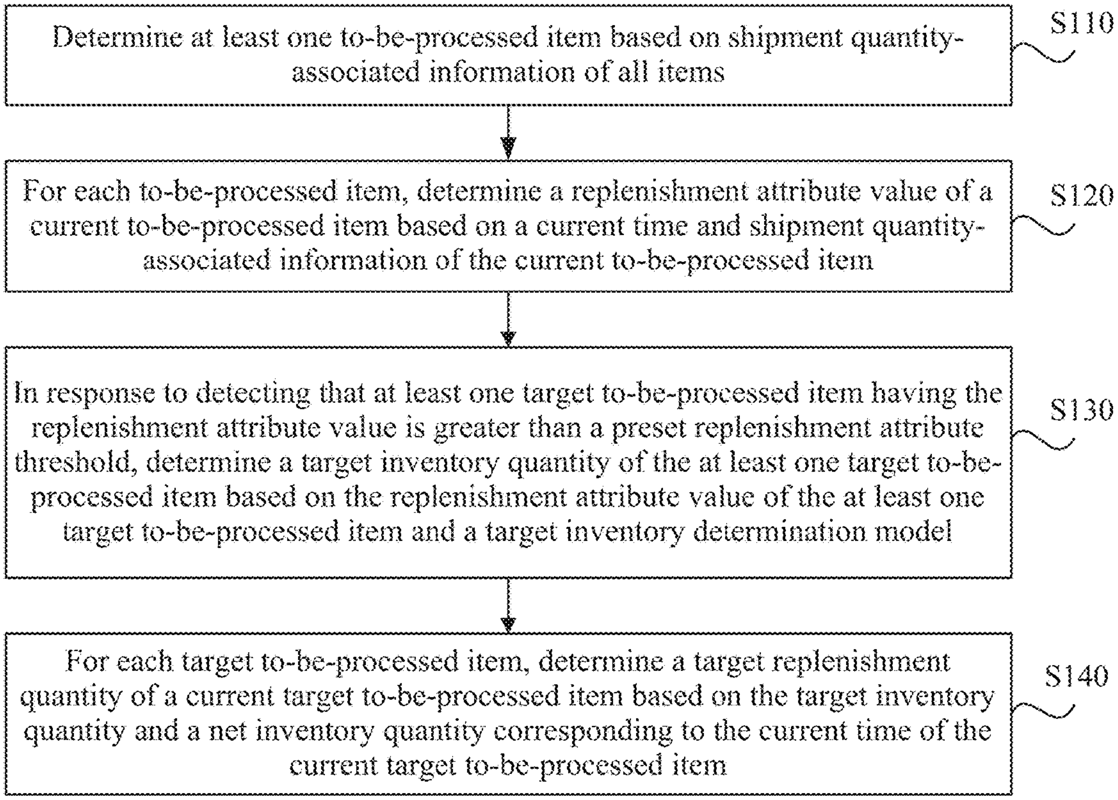
FIG. 1 is a schematic flowchart of a method for controlling item inventory according to an embodiment of the present disclosure.

The present disclosure is described hereinafter in conjunction with the drawings and embodiments. The embodiments described here are only intended to explain the present disclosure. For convenience of description, only the parts related to the present disclosure are shown in the drawings.

FIG. 1 is a schematic flow chart of a method for controlling item inventory according to an embodiment of the present disclosure. This embodiment can be applied to a case of determining a replenishment quantity of each item, and further effectively controlling inventory costs based on the replenishment quantity. The method can be executed by an apparatus for controlling item inventory. The apparatus can be implemented in the form of software and/or hardware. The hardware can be an electronic device. The electronic device can be a mobile terminal, a personal computer (PC), etc. The execution of the technical solution can be executed by a server, by a terminal device, or by the cooperation of the server and the terminal device.

Before the technical solutions of the embodiments of the present disclosure are introduced, the application scenarios may be illustratively described first. In practical life, some items are shipped more frequently and in larger quantities. Target inventory quantity and corresponding replenishment cycle can be set for this type of items. Moreover, the technical solution according to the embodiment of the present disclosure may also be adopted to determine the target inventory quantity of each item, and further determine a target replenishment quantity based on an existing inventory quantity.

As shown in FIG. 1, the method includes: S110 to S140.

In S110, at least one to-be-processed item is determined based on shipment quantity-associated information of all items.

The shipment quantity-associated information includes shipment date series and shipment quantity corresponding to each shipment date. The shipment date can be the date of each day, and the shipment quantity can be the quantity corresponding to the items sold each day. Then the shipment quantity can be 0 or any value greater than 0. The items determined based on the shipment quantity-associated information are used as to-be-processed items. The to-be-processed items can be all items or some of the all items. For example, the method for determining to-be-processed items may be: determining the number of shipment interval days based on shipment quantity-associated information. If the number of shipment interval days is greater than a preset number threshold of interval days, the item corresponding to the shipment quantity-associated information can be used as the to-be-processed item.

The quantity of at least one to-be-processed item may include one, two or even more, and its data is determined based on the shipment quantity-associated information of the at least one item.

This technical solution can determine target replenishment quantities of all items, and is especially applicable to determining the target replenishment quantities of to-be-processed items that meet certain conditions, such as some items with low shipment frequency, for example, automobile spare parts, etc.

The shipment quantity-associated information of each item can be obtained at a preset time point. The preset time point can be a relative time point or an absolute time point. The relative time point can be to obtain the shipment quantity-associated information of the item at a certain interval; for example, the interval duration can be one week. The absolute time point can be a fixed time point every day; for example, the fixed time point can be to obtain the shipment quantity-associated information of each item at ten o'clock every night. The items corresponding to the obtained shipment quantity-associated information may be items corresponding to one stock keeping unit (SKU), items corresponding to multiple SKUs, or all items.

In this embodiment, the shipment quantity-associated information includes shipment date and shipment quantity corresponding to the shipment date. Before the determining at least one to-be-processed item based on the shipment quantity-associated information of all items, this method further includes: based on the shipment dates and shipment quantities corresponding to the shipment dates of each item, determining a shipment interval duration between consecutive two shipments of each item, and updating the shipment interval duration to the shipment quantity-associated information of the respective item.

The shipment quantity-associated information includes shipment quantity of each item on each date, that is, it includes a time series and shipment quantity corresponding to each time point in the time series. The time here mainly refers to dates, and the dates in the time series are consecutive dates. In practical applications, the shipment quantity on a date may be 0 and a date may be omitted. in this case, the date can be added to the time series and the shipment quantity on this date can be marked as 0. Based on the shipment dates and the shipment quantities corresponding to the shipment dates of each item, a shipment interval duration between consecutive two shipments is determined, and the shipment interval duration can be used as part of the shipment quantity-associated information.

In this embodiment, determining the shipment interval duration may be: for the shipment quantity-associated information of each item, in response to detecting that shipment quantities of a current item are greater than a preset shipment quantity threshold, determining shipment dates corresponding to the shipment quantities as to-be-processed shipment dates; and based on the to-be-processed shipment dates corresponding to each item, determining a shipment interval duration between consecutive two shipments of the respective item.

The value in the shipment quantity can be 0, or any data greater than 0, and its data value corresponds to the actual quantity of items sold on that day.

The preset shipment quantity threshold can be 0. If the shipment quantities corresponding to shipment dates are greater than the preset shipment quantity threshold, the shipment dates are determined as to-be-processed shipment dates. The shipment interval duration between consecutive two shipments can be determined based on all to-be-processed shipment dates of each item. The number of shipment interval durations determined in this case can be 0, or any value greater than 0. Each item has a set of shipment interval days corresponding thereto, and each set of shipment interval days includes at least one shipment interval duration. That is, the shipment interval duration is an element in the set of shipment interval days.

For example, you can obtain shipment quantity-associated information of a SKU in 12 days, where the shipment quantities of all the days can be sequentially: H=[0, 1, 0, 0, 0, 0, 0, 0, 0, 10, 0, 0]. Based on the shipment quantity-associated information, the set of shipment interval days can be determined as Inv=[2,8]. Specifically, 2 means that an interval duration between consecutive two shipments is two days, and 8 means that an interval duration between consecutive two shipments is eight days. Since the SKU was not sold in the last few days, the 0 in the last part is not included in the number of interval days between sales.

Based on the above technical solution, after determining the number of shipment interval days corresponding to each item, the method further includes: determining a variation coefficient of each item based on at least one shipment interval duration corresponding to the respective item; and determining at least one to-be-processed item based on a preset variation coefficient threshold and all variation coefficients.

The variation coefficient is used to represent the fluctuation of item shipment intervals. Generally, when the variation coefficient is smaller, it indicates that the fluctuation of item sale intervals is smaller, and correspondingly, when the variation coefficient is larger, it indicates that the fluctuation of item sale intervals is greater. The preset variation coefficient threshold is a value set based on theoretical data. At least one to-be-processed item is determined based on the preset variation coefficient threshold and the variation coefficient of each item. For example, an item with a variation coefficient greater than the preset variation coefficient threshold may be taken as the to-be-processed item.

In this embodiment, determining a variation coefficient corresponding to each item may include: for the shipment interval duration of each item, determining an interval duration mean and an interval duration variance based on at least one shipment interval duration corresponding to a current item; and determining a variation coefficient of each item based on the interval duration mean and the interval duration variance corresponding to the respective item.

For the shipment quantity-associated information of each to-be-processed item, based on the shipment interval durations in the shipment quantity-associated information of the current item, an interval duration mean can be calculated, and moreover, an interval duration variance can be calculated. A variation coefficient is determined based on the ratio between the interval duration variance and the interval duration mean. In this embodiment, an item with a variation coefficient smaller than a preset variation coefficient threshold may be taken as the to-be-processed item.

In this embodiment, the advantage of determining the to-be-processed item based on the variation coefficient lies in that items that are sold intermittently can be determined from all items, thereby achieving the technical effect of processing items that are sold intermittently.

In S120, for each to-be-processed item, a replenishment attribute value of a current to-be-processed item is determined based on a current time and shipment quantity-associated information of the current to-be-processed item.

The current time can be a current date. The replenishment attribute value is used to represent the urgency of replenishment of the current to-be-processed item at the current time. If the replenishment attribute value is high, it means that it is required to replenish the current to-be-processed item. If the replenishment attribute value is small, it means that it is not required to replenish the current to-be-processed item.

For each to-be-processed item, the replenishment attribute value of each to-be-processed item can be determined based on the current time and the shipment date and shipment quantity of the to-be-processed item, so as to determine whether to replenish the to-be-processed item based on the replenishment attribute value.

In S130, in response to detecting that at least one target to-be-processed item whose replenishment attribute value is greater than the preset replenishment attribute threshold, a target inventory quantity of the at least one target to-be-processed item is determined based on the replenishment attribute value of the at least one target to-be-processed item and a target inventory determination model.

The preset replenishment attribute threshold is predetermined and can be used as a reference standard for determining whether to perform replenishment. The target to-be-processed item is the to-be-processed item that needs replenishing. The target inventory determination model is a predetermined mathematical model used to determine the target inventory quantity of each to-be-processed item based on the replenishment attribute value of the respective to-be-processed item.

The target inventory quantity can be an inventory quantity that the respective current item should have.

The target inventory quantities of different to-be-processed items can be the same or different. Whether they are the same is related to the replenishment attribute values of the to-be-processed items. In other words, the value of the target inventory quantity is determined by the target replenishment attribute value of each target to-be-processed item.

After the replenishment attribute value of each to-be-processed item is determined, it may be determined whether there is a to-be-processed item having the replenishment attribute value greater than a preset replenishment attribute threshold. If there is a to-be-processed item having the replenishment attribute value greater than the preset replenishment attribute threshold, this to-be-processed item can be used as a target to-be-processed item. For each target to-be-processed item, the replenishment attribute value of a current target to-be-processed item can be input into the target inventory determination model to obtain a target inventory quantity corresponding to the current target to-be-processed item. Other target to-be-processed items can be processed in the same way to obtain target inventory quantities corresponding to them.

In S140, for each target to-be-processed item, a target replenishment quantity of a current target to-be-processed item is determined based on the target inventory quantity and a net inventory quantity corresponding to the current time of the current target to-be-processed item.

Each to-be-processed item has a target inventory level corresponding thereto. The target inventory quantities of items can be the same or different. The target replenishment quantity is determined based on the determined target inventory quantity and the corresponding net inventory quantity.

For each target to-be-processed item, the target replenishment quantity of the current target to-be-processed item is determined by calculating the difference between the target inventory quantity and the net inventory quantity corresponding to the current time of the current target to-be-processed item.

The technical solution of this embodiment of the present disclosure is mainly determined based on the (T, S) strategy.

In the technical solution of the embodiment of the present disclosure, the replenishment attribute value of each to-be-processed item can be determined based on the current time and the shipment quantity-associated information of each to-be-processed item. If there is a target to-be-processed item having a replenishment attribute value greater than a preset replenishment attribute threshold, the replenishment attribute value of the target to-be-processed item can be used as an input of the target inventory quantity determination model to determine a target inventory quantity corresponding to the target to-be-processed item, and further determine a target replenishment quantity based on the target inventory quantity and an existing net inventory quantity of the target to-be-processed item at the current time. This approach addresses issues in related technologies where the inventory quantities of items are randomly determined or fixed, resulting in the determined replenishment quantity being mismatch with the actual required quantity, thus causing the issue of high inventory costs; and realizes the technical effects of determining the target replenishment quantity based on the shipment quantity-associated information of each to-be-processed item, thereby improving the accuracy of determining the target replenishment quantity, effectively controlling inventory costs.

Figure 2:
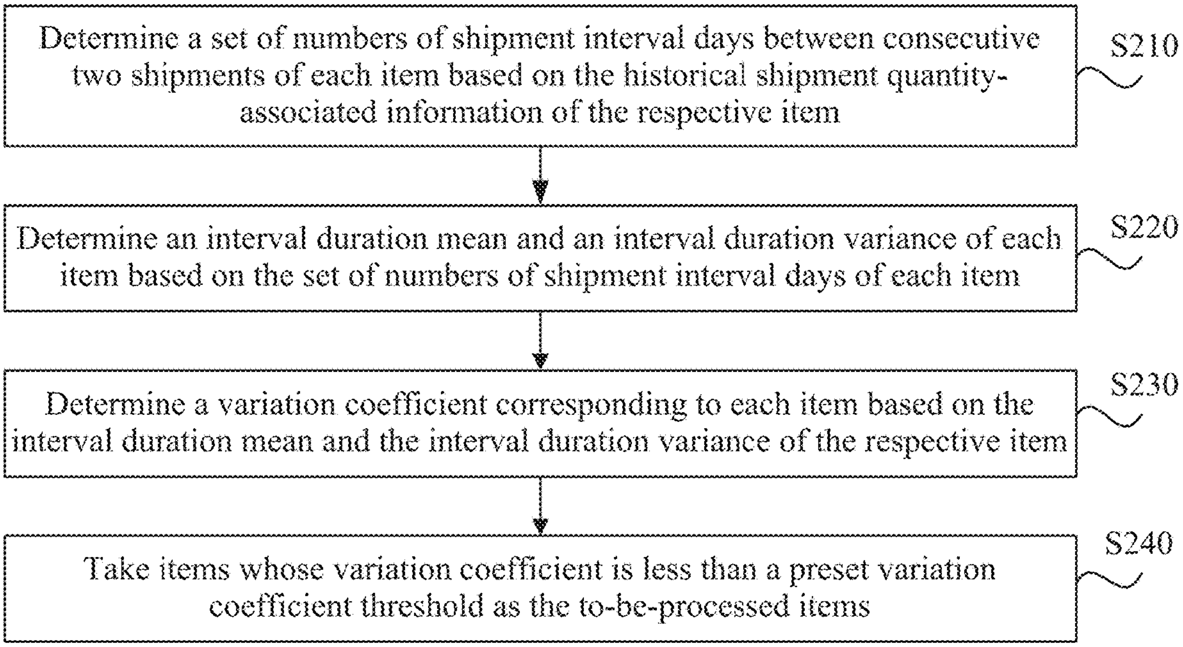
FIG. 2 is a schematic flowchart of determining a to-be-processed item from multiple items according to an embodiment of the present disclosure.

FIG. 2 is a schematic flowchart of determining a to-be-processed item from multiple items according to an embodiment of the present disclosure. This technical solution can determine a target inventory quantity of each item on each date, and is especially suitable for determining the target inventory quantities of items for intermittent sale. Therefore, before determining the target inventory quantities of items for intermittent sale, you may first determine the items for intermittent sale, that is, the to-be-processed items. The technical terms that are the same as or corresponding to the above embodiments will not be described again here.

As shown in FIG. 2, the method includes: S210 to S240.

In S210, a set of numbers of shipment interval days between consecutive two shipments of each item is determined based on the historical shipment quantity-associated information of the respective item.

In the process of practical application, the user can set corresponding filtering conditions, for example, the filtering condition is to obtain items of category A, and determine the to-be-processed items from the items of category A. Apparently, the to-be-processed items can also be determined from all items.

The shipment quantity-associated information of each item within a preset time period can be obtained, for example, the shipment date is a date within two months, and the shipment quantity corresponding to each shipment date can be determined. The shipment date on which shipment quantity is greater than a preset shipment quantity threshold is used as a to-be-processed shipment date, and the number of shipment interval days between consecutive two shipment dates is determined, and each number of shipment interval days is used as an element of the set of numbers of shipment interval days.

For example, the preset time period may be 12 days, and the shipment quantity for each date is H=[0, 1, 0, 0, 0, 0, 0, 0, 10, 0, 0]. Based on the shipment quantities, it can be determined that there are shipments on the second and tenth days, and the numbers of days between consecutive two shipments can be determined as 2 and 8. Correspondingly, the set of numbers of shipment interval days is Inv=[2,8]. Because the SKU was not sold in the last few days, the 0 in the last part is not included in the number of shipment interval days.

In S220, an interval duration mean and an interval duration variance of each item are determined based on the set of numbers of shipment interval days of each item.

For example, if the numbers of shipment interval days of an item are 2 and 8 respectively, the calculated mean of the numbers of shipment interval days is 5, and the calculated variance of the numbers of shipment interval days is 3. That is, the interval duration mean is 5, the interval duration variance is 3, and their unit is day.

In S230, a variation coefficient corresponding to each item is determined based on the interval duration mean and the interval duration variance of the respective item.

Illustratively, after an interval duration mean and an interval duration variance of each item are determined, a variation coefficient is obtained by calculating the ratio between the interval duration variance and the interval duration mean of each item. For example, SKUA=3/5-0.6, that is, the variation coefficient of SKUA is 0.6.

Items whose variation coefficient is less than a preset variation coefficient threshold are taken as the to-be-processed items.

Generally, the variation coefficient is used to represent fluctuations of sale intervals of an item. In a case where the variation coefficient is smaller, the fluctuations of the sale intervals are smaller. In a case where the variation coefficient is larger, the fluctuations of the sale intervals are greater.

In the process of practical application, if the sale intervals of an item fluctuate significantly, the shipment quantity of this item at a time is difficult to predict, so the process can be performed for items with small sale interval fluctuations.

Items having a variation coefficient less than a preset variation coefficient threshold can be taken as to-be-processed items. The to-be-processed items can be added to the item list to periodically determine whether the items in the item list need replenishing, thereby effectively controlling inventory costs.

When the variation coefficient is less than the preset variation coefficient threshold, it means that the shipment intervals of the item do not fluctuate significantly. Items with small shipment intervals can be treated as to-be-processed items for intermittent sales. This embodiment can process the to-be-processed items for intermittent sale to determine the target inventory quantity corresponding to each to-be-processed item, and then determine a target replenishment quantity of the respective to-be-processed item, thereby achieving the technical effects of effectively controlling inventory costs.

According to the technical solution of the embodiment of the present disclosure, by processing the shipment quantity-associated information of each item, at least one number of shipment interval days corresponding to the respective item can be determined. Based on at least one number of shipment interval days corresponding to each item, the variation coefficient of the respective item can be determined, so as to determine the to-be-processed items based on the variation coefficients. This technical solution improves the technical effects of determining the target inventory quantities of items for intermittent sale, thereby effectively controlling the inventory costs of each to-be-processed item based on target inventory quantity and existing inventory quantity.

Figure 3:
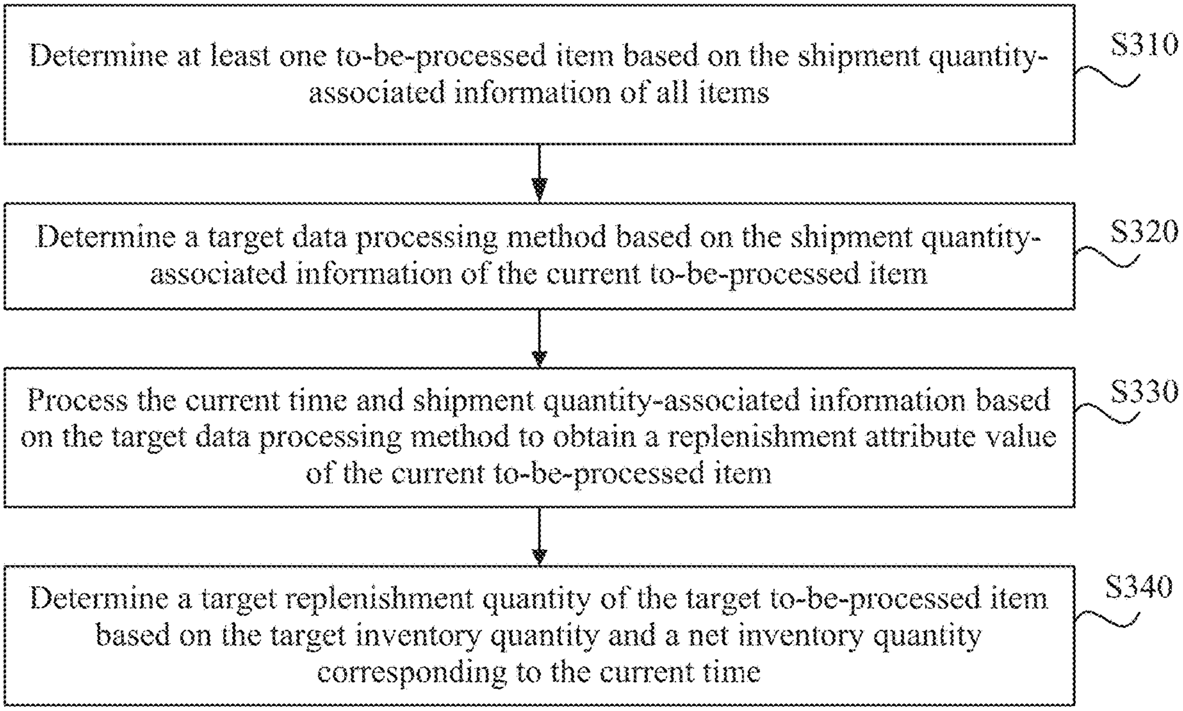
FIG. 3 is a schematic flowchart of a method for controlling item inventory according to an embodiment of the present disclosure.

FIG. 3 is a schematic flowchart of a method for controlling item inventory according to an embodiment of the present disclosure. Based on the foregoing embodiments, the determination of a replenishment attribute value of each to-be-processed item can be described. The implementation method can be found in the description of this embodiment. The technical terms that are the same as or corresponding to the above embodiments will not be described again here.

As shown in FIG. 3, the method includes: S310 to S340.

In S310, at least one to-be-processed item is determined based on the shipment quantity-associated information of all items.

In S320, a target data processing method is determined based on the shipment quantity-associated information of the current to-be-processed item.

The target data processing method may be a processing method that determines a replenishment attribute value of the current to-be-processed item. For different shipment quantity-associated information, the data processing methods adopted are also different. In order to improve the effective control of inventory costs, different data processing methods can be adopted to process the shipment quantity-associated information.

After a to-be-processed item is determined, a processing method for processing the shipment quantity-associated information can be determined based on the shipment quantity-associated information of the to-be-processed item, and this processing method can be used as a target data processing method, so as to process, based on the target data processing method, the shipment quantity-associated information of the respective to-be-processed item to obtain a replenishment attribute value of the respective to-be-processed item.

In this embodiment, the determining a target data processing method based on the shipment quantity-associated information may include: determining at least one shipment interval duration based on shipment quantities corresponding to all shipment dates in the shipment quantity-associated information; if the at least one shipment interval duration satisfies a preset uniform distribution, determining the target data processing method to be a mean estimation method; and if the at least one shipment interval duration does not satisfy the preset uniform distribution, determining the target data processing method to be a quantile estimation method.

If the at least one shipment interval duration is concentrated within a numerical range, it can be determined that the shipment interval durations are relatively uniform. In this case, it can be determined that the shipment interval durations meet a uniform distribution. The variance can represent the degree of fluctuation of the numerical values. The determining whether the uniform distribution is satisfied can also involve determining whether the interval duration variance is less than a preset threshold. If the interval duration variance is less than the preset threshold, it means that the shipment interval durations of the to-be-processed item satisfy the uniform distribution. If the interval duration variance is not less than the preset threshold, it means that the shipment interval durations of the to-be-processed item do not satisfy the uniform distribution. The data processing method used when the preset uniform distribution is satisfied is used as a mean estimation method, and the data processing method used when the preset uniform distribution is not satisfied is used as a quantile estimation method. The quantile estimation method is to determine the quantile fractile based on the shipment quantity-associated information, and then determine the replenishment attribute value based on the quantile fractile. The mean estimation method is determined based on the shipment interval duration mean and the shipment interval duration variance in the shipment quantity-associated information.

When processing each to-be-processed item, a target data processing method corresponding to a to-be-processed item can be determined first based on the shipment interval duration in the shipment quantity-associated information of the respective to-be-processed item, and then a replenishment attribute value of the respective to-be-processed item is determined based on the target data processing method.

In S330, the current time and shipment quantity-associated information are processed based on the target data processing method to obtain a replenishment attribute value of the current to-be-processed item.

The replenishment attribute value is used to represent the extent to which the to-be-processed item needs replenishing. For example, when the replenishment attribute value is larger, it indicates that the demand for replenishing the to-be-processed item is greater. When the replenishment attribute value is smaller, it indicates that the demand for replenishing the to-be-processed item is smaller.

After the target data processing method corresponding to each to-be-processed item is determined, the shipment quantity-associated information of the to-be-processed item can be processed based on the target data processing method to obtain the replenishment attribute value of the respective to-be-processed item.

In this embodiment, before the replenishment attribute value is determined, other associated information corresponding to the to-be-processed item can be determined first, and then the target data processing method is used to obtain the replenishment attribute value. For example, a to-be-used shipment date in the shipment quantity-associated information that has a shipment quantity greater than a preset shipment quantity threshold and has a smallest interval duration from the current time is determined; based on the date corresponding to the current time and the to-be-used shipment date, a first duration is determined; and the first duration and the shipment quantity-associated information are processed based on the target data processing method to obtain a replenishment attribute value of the current to-be-processed item.

The current time mainly refers to the current date. The first duration mainly refers to the interval duration between the current time and the to-be-used shipment date. The to-be-used shipment date can be the date closest to the current time and on which sale occurred. For example, if the current date is June 20 and the last sale date before the current date is May 31, then the to-be-used date is May 31. Accordingly, the first duration is 20 days. The preset shipment threshold can be 0.

For each to-be-processed item, it is possible to determine, based on the shipment interval duration in the shipment quantity-associated information of the current to-be-processed item, the to-be-used shipment date which is closest to the current time and on which shipment quantity is greater than the preset shipment threshold. The first duration can be determined based on the current date and the to-be-used shipment date. By processing the first duration and the shipment quantity-associated information, a replenishment attribute value of the current to-be-processed item can be determined.

In this embodiment, the target data processing method includes any one of the above two methods. Correspondingly, the processing method for processing the shipment quantity-associated information of the respective to-be-processed item based on the target data processing method is as follows:

The first implementation method may be: the mean estimation method. The first duration and the interval duration variance determined based on the shipment interval durations are processed based on the mean estimation method to determine a replenishment attribute value of the current to-be-processed item.

If the target data processing method of the current to-be-processed items is the mean estimation method, the shipment interval duration variance and the shipment interval duration mean can be determined based on the shipment interval durations. By calculating the ratio of the first duration and the shipment interval duration variance, a replenishment attribute value of the current to-be-processed item is obtained.

For example, k is a variable that changes with the date. For example, the date of the last sale was Mar. 1, 2021, and when the inventory was checked on Mar. 6, 2021, the first duration k=5. If a replenishment suggestion for a SKU is given on March 6, it can be determined that the numbers of shipment interval days for the SKU in the past 60 days are [10, 25, 12], and a shipment interval duration mean is calculated to be $\overline{D}_i$=15.6, which is rounded up to 16. By calculating the ratio between the first duration and the shipment interval duration mean, the replenishment attribute value of the SKU can be obtained. For example, $$p_i(k) = \frac{k}{\overline{D}_i} = \frac{5}{16} = 0.3125,$$

thus, a replenishment attribute value of the SKU is obtained as 0.3125.

The second implementation method may be: the quantile estimation method. The quantile estimation method includes two sub-methods, and the corresponding sub-estimation method can be determined based on the shipment quantity-associated information.

If the target data processing method is a quantile estimation method, a target quantile sub-estimation method is determined based on the shipment quantity-associated information and a preset quantile; and the first duration and the shipment quantity-associated information are processed based on the target quantile sub-estimation method to determine a replenishment attribute value of the current to-be-processed item.

The shipment quantity-associated information of the to-be-processed item can determine the processing method used when to process the to-be-processed item.

In this embodiment, the determining the target quantile sub-estimation method based on the shipment quantity-associated information may be that: the shipment quantity-associated information includes the number of shipments corresponding to the shipment interval durations, and the determining a target quantile sub-estimation method based on the shipment quantity-associated information and a preset quantile includes as follows.

If the preset quantile is less than or equal to the reciprocal of the number of shipments, then the target quantile sub-estimation method is determined to be a first quantile sub-estimation method; and if the preset quantile is greater than the reciprocal of the number of shipments, the target quantile sub-estimation method is determined to be a second quantile sub-estimation method.

Each to-be-processed item has a corresponding number of shipments. The number of shipments can be the number of times an item is sold within a preset time period. That is to say, the number of shipments can be determined based on the number of shipment interval durations in the shipment quantity-associated information, that is, the number of shipments is the same as the number of shipment interval durations. The preset quantile is a percentage set by the user based on practical demands. Optionally, the percentage can be 0.8.

When it is determined that the target data processing method corresponding to the current to-be-processed item is the target quantile sub-estimation method, shipment interval durations in the shipment quantity-associated information of the current to-be-processed item can be fitted to obtain an empirical distribution. If the preset quantile is less than or equal to the reciprocal of the number of shipments, it means that the number of shipments within a certain period of time is small. In this case, the first quantile sub-estimation method can be used to determine a replenishment attribute value of the current to-be-processed item. If the preset quantile is greater than the reciprocal of the number of shipments, the second quantile sub-estimation method can be used to determine a replenishment attribute value. In this embodiment, sub-estimation methods corresponding to different to-be-processed items are determined, thereby improving the accuracy of determining the replenishment attribute values of the to-be-processed items.

Next, it is explained how to use different quantile sub-estimation methods to process the shipment-associated information of the to-be-processed items to obtain replenishment attribute values of the to-be-processed items.

The first implementation may be: if the target quantile sub-estimation method is the first quantile sub-estimation method, determining a replenishment attribute value of a current to-be-processed item based on the number of shipment interval days, a preset quantile, the number of shipments and the first duration.

For each to-be-processed item, there is at least one number of shipment interval days corresponding thereto. At least one number of shipment interval days of the current to-be-processed item can be obtained, and by processing the number of shipment interval days, the preset quantile, the number of shipments and the first duration, a replenishment attribute value of the to-be-processed item can be obtained.

In this embodiment, the determining a replenishment attribute value of a current to-be-processed item based on the number of shipment interval days, a preset quantile, the number of shipments and the first duration, includes: obtaining a first data value based on the product of a minimum value of the numbers of shipment interval days, the preset quantile and the number of shipments;

and determining a replenishment attribute value of the current to-be-processed item based on the ratio of the first duration to the first data value.

For the current to-be-processed item, the minimum value of the target shipment interval durations can be obtained from at least one number of shipment interval days corresponding to the current to-be-processed item. The product of the target shipment interval duration, the preset quantile, and the number of shipments is calculated to obtain the intermediate value, which is the first data value. By calculating the ratio of the first duration to the first data value, the replenishment attribute value of the current to-be-processed item is obtained. The second implementation may be that the determining a replenishment attribute value of the current to-be-processed item based on the target quantile sub-estimation method includes: if the target quantile sub-estimation method is the second quantile sub-estimation method, determining a target quantile fractile based on the preset quantile and the shipment quantity-associated information; and determining a replenishment attribute value of the current to-be-processed item based on the target quantile fractile and the first duration.

The target quantile fractile can be determined based on the shipment interval duration in the shipment quantity-associated information and the preset quantile. By calculating the ratio between the first duration and the target quantile fractile, a replenishment attribute value of the to-be-processed item is obtained.

When determining a replenishment attribute value using the second quantile sub-estimation method, it is necessary to determine a target quantile fractile corresponding to the to-be-processed item, and then determine the replenishment attribute value based on the target quantile fractile. Optionally, the determining a target quantile fractile based on the preset quantile and the shipment quantity-associated information includes: fitting based on the numbers of shipment interval days in the shipment quantity-associated information to obtain a target empirical distribution; and then determining the target quantile fractile based on the preset quantile and the target empirical distribution.

For each to-be-processed item, the target empirical distribution of the current to-be-processed item can be obtained by fitting based on the shipment quantity-associated information of the current to-be-processed item. Based on the preset quantile and the target empirical distribution, a target quantile fractile corresponding to the preset quantile can be determined. For each to-be-processed item, a target quantile fractile corresponding thereto can be determined by using the above method.

For example, a set of shipment interval days, Inv, can be obtained for the historical sales of each SKU, and each shipment interval duration in the set of interval days, Inv, can be used as a sample to fit an empirical distribution. An $\alpha$ quantile fractile, which is the preset quantile fractile, can be obtained based on the empirical distribution. For example, Inv=[10,25,12] means that the SKU has been sold three times in the past period of time (such as 60 days). The sale interval days are 10, 25, and 12 days respectively. A target empirical distribution corresponding to the SKU can be obtained by fitting based on the above interval days. Based on the target empirical distribution and the preset quantile fractile $\alpha$=80%, a target quantile fractile is determined to be 19.8. The sale interval $\alpha$ quantile fractiles of all SKUs can be obtained using the above method.

The number of quantile fractiles chosen depends on the company's expectations for inventory levels. If a is set large, it means that the company believes that the expected sale interval will be long, and the replenishment interval will also be extended; if $\alpha$ is set small, it means that the company believes that the expected sale interval will be short, and the replenishment interval will also be shortened. In other words, users can set preset quantile fractiles according to practical demands.

In order to understand the processing conditions and methods for the quantile sub-estimation methods to process shipment quantity-associated information, reference can be made to the following illustrative description.

Figure 4:
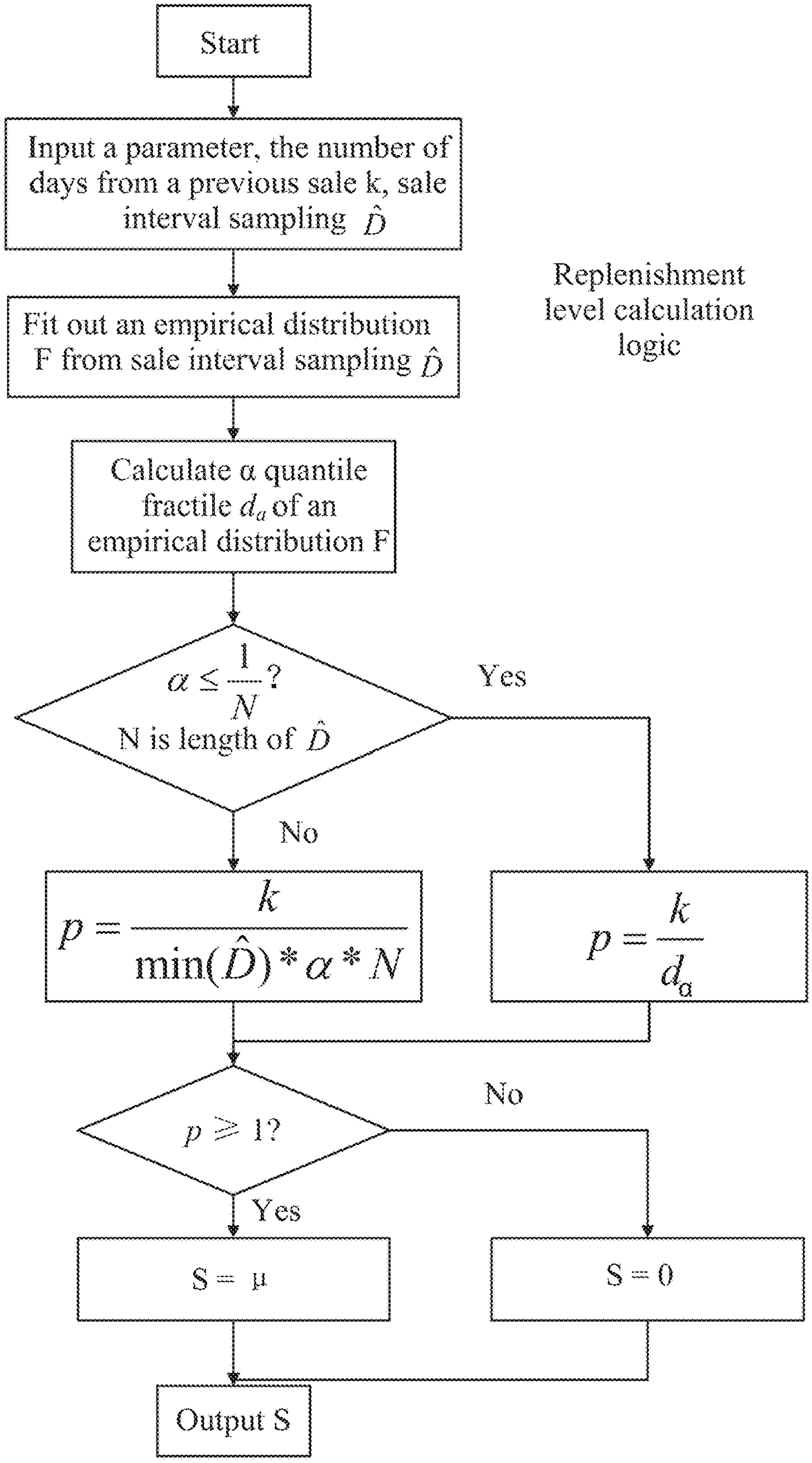
FIG. 4 is a schematic flowchart of replenishment vertical screen calculation logic according to an embodiment of the present disclosure.

For example, referring to FIG. 4, a parameter, the number of interval days k since the last sale, that is, the first duration k is input. A target empirical distribution F corresponding to the current to-be-processed item can be obtained by fitting based on at least one shipment interval duration of the current to-be-processed item. Based on the preset quantile fractile $\alpha$ of the empirical distribution F, a target quantile $d_\alpha$ is obtained. If the preset quantile fractile is less than or equal to the reciprocal of the number of shipments, the first quantile sub-estimation method is used. If the preset quantile fractile is greater than the reciprocal of the number of shipments, the second quantile sub-estimation method is used.

The first quantile sub-estimation method is: the mean estimation method is used to determine whether SKUs with a relatively uniform distribution of sale intervals trigger replenishment. For SKUs with a non-uniform distribution of sale intervals, a more universal calculation method can be proposed, namely the quantile fixed value method. For a random variable $D_i$, a sample of sale interval can be obtained from historical data, for example, $\hat{D}_i$=[10, 25, 12]. An empirical distribution may be obtained by fitting based on the sample, and then a 80% quantile $d_{0.8}$=19.2 is given for the empirical distribution. The historical sales data set H of this SKU in the past 60 days is known. It can obtain from H a sample set of interval days between every two sales, for example, $\hat{D}_i$=[10, 25, 12], so as to obtain the empirical distribution F of the interval days D. From F, the $\alpha$ quantile $d_\alpha$ of sale interval of the SKU can be calculated, such as $d_{0.8}$=19.2. The value of quantile is substituted into the formula p(k). That is, a replenishment attribute value of the current to-be-processed item at the current time is obtained.

$$p_i(k) = \frac{k}{d_\alpha}, \forall\, i \in I.$$

Since the target SKU may have had very few sales in the past 60 days, for example, $\hat{D}_i$=[10, 25, 12], in this case, the set $\alpha$<0.3, then $\alpha$ quantile cannot be obtained from the empirical distribution F obtained by fitting. In this case, p(k) is required to be calculated through the following method:

$$p(k) = \frac{k}{\min(\hat{D}) * \alpha * N}$$

In the formula, N is the length of $\hat{D}_i$, that is, the number of shipments, min($\hat{D}$) represents the minimum value of the shipment interval durations of the current to-be-processed items, and a represents the preset quantile.

If p(k)≥1, let S=μ (μ represents the preset target replenishment quantity), or use the target replenishment quantity determination model to determine the optimal S (target replenishment quantity) of the current to-be-processed item; if p(k)<1, the target replenishment quantity is 0, that is, there is no need to determine the target replenishment quantity.

The second quantile sub-estimation method: if the preset quantile is greater than the reciprocal of the number of shipments, the second sub-estimation method can be used. For example, the last sale date was Mar. 1, 2021, then when the inventory is checked on Mar. 6, 2021, k=5. Next, it is required to give a replenishment suggestion for a SKU on that day on March 6. The steps are as follows. It is assumed that the sample of number of sale interval days in historical 60 days of the SKU is [10, 25, 12], the mean of numbers of interval days is calculated as $\overline{D}_i$=15.6 and it is upward rounded to 16. Because currently k=5, $$p_i(k) = \frac{k}{\overline{D}_i} = \frac{5}{16} = 0.3125.$$

A threshold $p_0$=0.5 is set in advance. If $p_i(k) \geq p_0$, the replenishment level calculation is triggered, that is, the target replenishment quantity determination model is used to process the replenishment attribute values to obtain the target replenishment quantity; if $p_i(k) < p_0$, the target replenishment quantity is 0.

Based on the above, it can be seen that in different data processing methods, preset replenishment attribute thresholds are also different. Therefore, after the replenishment attribute value is determined, it can be determined based on the replenishment attribute value threshold corresponding to the data processing method whether to determine a target replenishment quantity corresponding to the current to-be-processed item, that is, whether the current to-be-processed item needs replenishing.

In S340, a target replenishment quantity of the target to-be-processed item is determined based on the target inventory quantity and a net inventory quantity corresponding to the current time.

A net inventory quantity corresponding to the current time can be determined. The net inventory quantity can be the rest inventory quantity obtained from the quantity of inventory currently in the warehouse minus what has been sold. By calculating the difference between target inventory and net inventory, the target replenishment quantity for the corresponding to-be-processed item can be determined.

The technical solution of the embodiment of the present disclosure can determine the target data processing method corresponding to each to-be-processed item based on the shipment quantity-associated information, and then determine the replenishment attribute value of the corresponding to-be-processed item based on the target data processing method, thereby improving the accuracy of replenishment attribute value determination, and further achieving the technical effect of effectively controlling the inventories of to-be-processed items.

Figure 5:
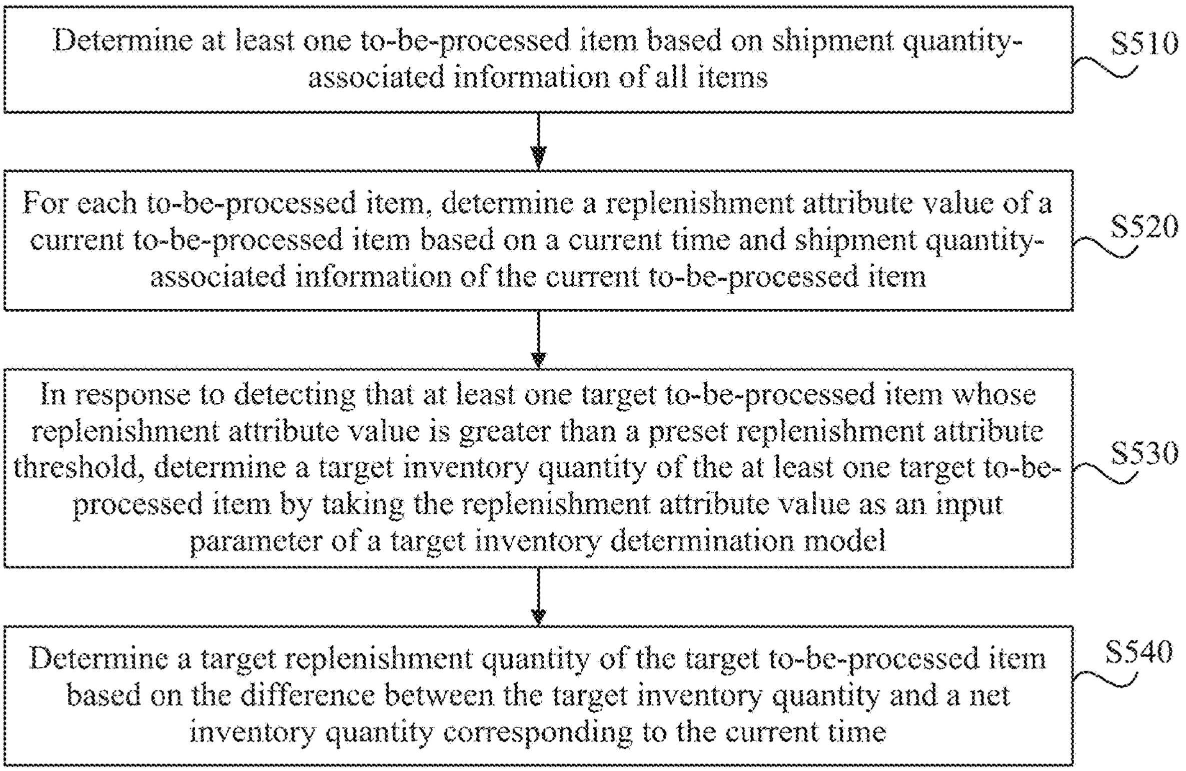
FIG. 5 is a schematic flowchart of another method for controlling item inventory according to an embodiment of the present disclosure.

FIG. 5 is a schematic flowchart of another method for controlling item inventory according to an embodiment of the present disclosure. Based on the foregoing embodiments, after determining the replenishment attribute value of each target to-be-processed item, the target inventory quantity of the corresponding target to-be-processed item can be determined based on the replenishment attribute value, and then the target replenishment quantity is determined based on the target inventory quantity, to achieve effective control of inventory costs. The technical terms that are the same as or corresponding to the above embodiments are not described again here.

As shown in FIG. 5, the method includes: S510 to S540.

In S510, at least one to-be-processed item is determined based on shipment quantity-associated information of all items.

In S520, for each to-be-processed item, a replenishment attribute value of a current to-be-processed item is determined based on a current time and shipment quantity-associated information of the current to-be-processed item.

In S530, in response to detecting that there exists at least one target to-be-processed item whose replenishment attribute value greater than a preset replenishment attribute threshold, a target inventory quantity of the at least one target to-be-processed item is determined by taking the replenishment attribute value as an input parameter of a target inventory determination model.

This technical solution can be applied to items for intermittent shipment. For items for intermittent shipment, a binomial distribution method can be used to determine the probability of occurrence of demand for each item at the current time, that is, the replenishment attribute value of the item at the current time. Then based on the binomial distribution, an objective function for calculating the target inventory is determined, that is, the target inventory determination model is determined.

The target inventory determination model is a preset mathematical model. The mathematical model can be a derivative function. The mathematical model is as follows:

$$\frac{\partial E[C(S)]}{\partial S} = h\frac{1}{T}\sum_{r=1}^{T}(1-p)^{L+r} + \frac{1}{T}\sum_{r=1}^{T}\sum_{k=1}^{L+r}\left((L+r;k)p^k(1-p)^{L+r-k}\right)\times \left(-b\int_{y=S}^{\infty}\phi_{D,k}(y)dy + h\int_{y=0}^{S}\phi_{D,k}(y)dy\right)$$

$$= h\frac{1}{T}\sum_{r=1}^{T}(1-p)^{L+r} + \frac{1}{T}\sum_{r=1}^{T}\sum_{k=1}^{L+r}\left((L+r;k)p^k(1-p)^{L+r-k}\right)\times$$

-continued $$(-b(1-\Phi_{D,k}(S)) + h\Phi_{D,s}(S))$$

$$= h\frac{1}{T}\sum_{r=1}^{T}(1-p)^{L+r} + \frac{1}{T}\sum_{r=1}^{T}\sum_{k=1}^{L+r}\left((L+r;k)p^k(1-p)^{L+r-k}\right)\times (-b+(b+h)\Phi_{D,s}(S)).$$

In the formula, h is inventory holding cost, and is a known value; T represents a preset period for determining a replenishment attribute value of a to-be-processed item; p represents the determined replenishment attribute value; b represents an out-of-stock cost, this cost is a known value; L represents a preset advance time, and the unit of the time is day; r represents the current time in the cycle, and k represents a first duration, that is, an interval duration of the current time from a previous shipment; ΦD,k(S) represents the cumulative distribution function of normal distribution, which is a known function.

The derivative function is an increasing function, so when the value of the derivative function is 0, the corresponding extremum can be a target inventory quantity of the target to-be-processed item.

For example, let the left side of the derivative=0, it can obtain:

$$0 = h\frac{1}{T}\sum_{r=1}^{T}(1-p)^{L+r} + \frac{1}{T}\sum_{r=1}^{T}\sum_{k=1}^{L+r}\left((L+r;k)p^k(1-p)^{L+r-k}\right)\times(-b+(b+h)\Phi_{D,s}(S))$$

This formula can be transformed mathematically:

$$0 = h\frac{1}{T}\sum_{r=1}^{T}(1-p)^{L+r} + \frac{1}{T}\sum_{r=1}^{T}\sum_{k=1}^{L+r}\left((L+r;k)p^k(1-p)^{L+r-k}\right)\times(-b+(b+h)\Phi_{D,s}(S))$$

$$\frac{-h\sum_{r=1}^{T}(1-p)^{L+r}}{\sum_{r=1}^{T}\sum_{k=1}^{L+r}\left((L+r;k)p^k(1-p)^{L+r-k}\right)} = (-b+(b+h)\Phi_{D,s}(S)$$

$$b - \frac{h\sum_{r=1}^{T}(1-p)^{L+r}}{\sum_{r=1}^{T}\sum_{k=1}^{L+r}\left((L+r;k)p^k(1-p)^{L+r-k}\right)} = \Phi_{D,s}(S)$$

$$\Phi_{D,s}(S) = \frac{b}{b+h} - \frac{h\sum_{r=1}^{T}(1-p)^{L+r}}{(b+h)\sum_{r=1}^{T}\sum_{k=1}^{L+r}\left((L+r;k)p^k(1-p)^{L+r-k}\right)}$$

If the known data values are respectively: h=10, b=20, L=2, p=0.6, when substituting them into the formula, it can obtain:

$$\Phi_{D,s}(S) = \frac{20}{10+20} - \frac{10\sum_{r=1}^{1}(1-p)^{2+r}}{(10+20)\sum_{r=1}^{2}\sum_{k=1}^{2+r}\left((2+r;k)0.6^k(1-0.6)^{2+r-k}\right)}$$

$$= \frac{2}{3} - \frac{2\sum_{r=1}^{1}(1-0.6)^{2+r}}{3\sum_{r=1}^{2}\sum_{k=1}^{2+r}\left((2+r;k)0.6^k(1-0.6)^{2+r-k}\right)}$$

$$= 0.637$$

ΦD,k(S) is the probability density function of sales quantity. Since shipment quantity is in the normal distribution, it is the probability density function of the normal distribution. The mean and variance of sale quantities can be obtained from historical data. If the mean is 3 and the variance is 1, it can obtain: ΦD,k(S)=0.637.

To find the inverse function of the normal distribution, it can directly use Python's normal distribution function package to calculate it. The codes are shown as follows:

```
from scipy.stats import norm
S=(norm(3,1).ppf(0.637)
```

The optimal S is obtained, at this time S=3.3505500627559512.

Round up and take S=4. That is, the target inventory quantity can be obtained as 4.

In S540, a target replenishment quantity of the target to-be-processed item is determined based on the difference between the target inventory quantity and a net inventory quantity corresponding to the current time.

The technical solution of the embodiment of the present disclosure can determine the target replenishment quantity of the corresponding to-be-processed item based on the replenishment attribute value of each to-be-processed item. That is, for different to-be-processed items, the target replenishment quantities corresponding thereto are different, it addresses the technical issue in related technologies of randomly setting different target replenishment quantities for different items, or setting the same target inventory quantity for different items, which fails to meet the practical situation, resulting in the technical issue of inability to effectively control inventory costs, and achieves technical effects of effectively controlling inventory costs.

Figure 6:
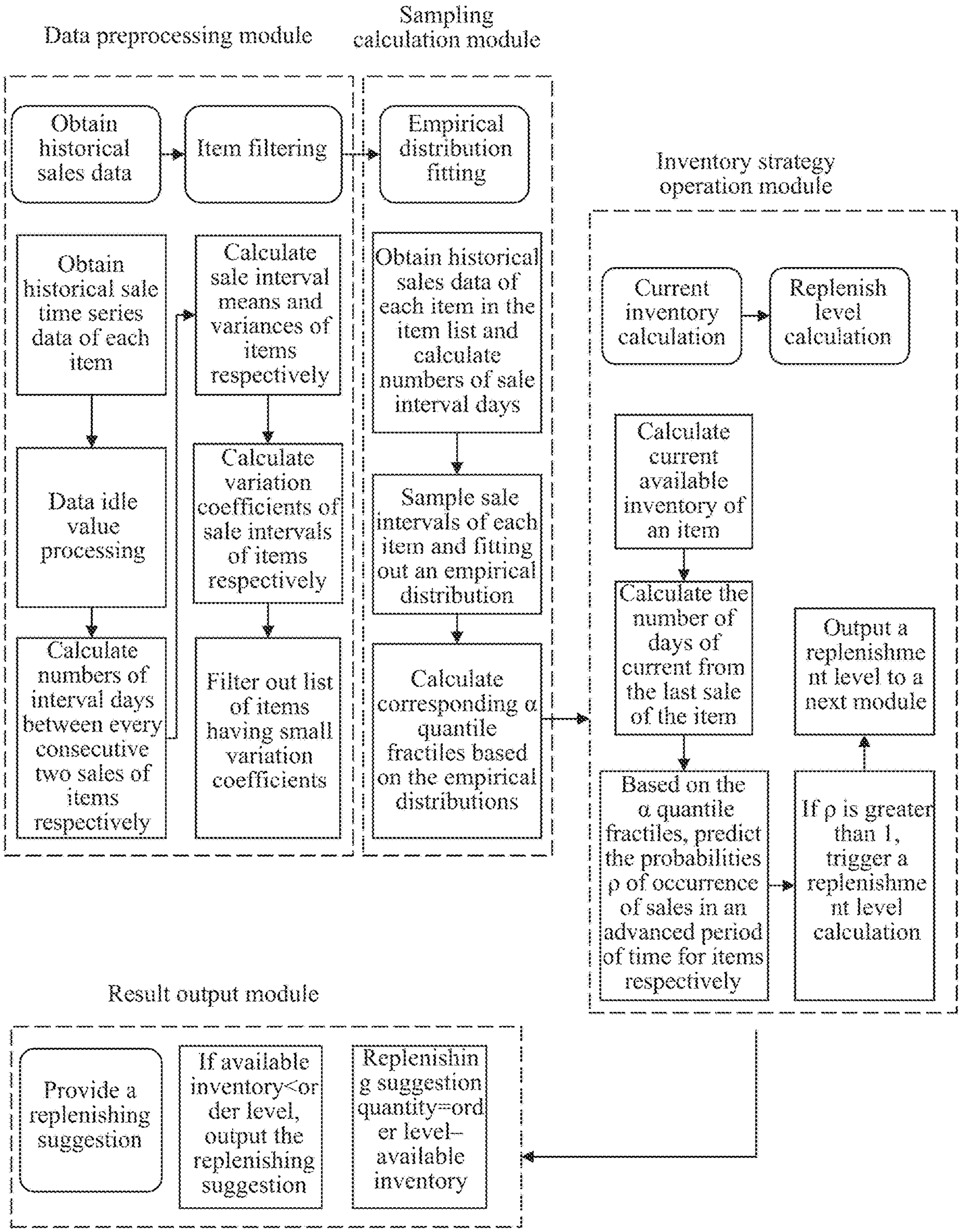
FIG. 6 is a schematic flowchart of another method for controlling item inventory according to an embodiment of the present disclosure.

As an optional embodiment of the above embodiment, FIG. 6 is a schematic flowchart of another method for controlling item inventory according to an embodiment of the present disclosure. As shown in FIG. 6, the method includes as follows.

Referring to FIG. 6, determining target replenishment quantities of target to-be-processed items can be implemented based on four modules. A first module can be a data preprocessing model, configured to determine to-be-processed items, for example, obtain historical sales data of all items, and determine the to-be-processed items based on the historical sales data of all items, that is, perform item filtering; obtain historical sale time series data of each item within a preset period of time; determine the number of sale interval days between two consecutive sales based on historical sale time series data; determine a sale interval duration mean and sale interval duration variance of the sale interval durations based on the numbers of sale interval days of each item; determine the variation coefficient of the corresponding item based on the sale interval duration mean and the sale interval duration variance of each item; take items with a variation coefficient smaller than a preset variation coefficient threshold as to-be-processed items, that is, filter out a list of to-be-processed items with a small variation coefficient.

A second module is a collection and calculation module, which is set to acquire the historical sales data of each to-be-processed item in the list of to-be-processed items, and determine the numbers of sale interval days based on the historical sales data. An empirical distribution can be obtained by fitting based on the numbers of sale interval days of each item, and a target quantile is calculated based on the empirical distribution.

A third module is an inventory strategy operation module. This module is mainly set to determine an existing inventory quantity and a target inventory quantity, and determine a target replenishment quantity based on the existing inventory quantity and the target inventory quantity.

For each item, the number of days between the current time and the previous sale of the current item is determined, and a replenishment attribute value corresponding to the current item at the current moment is determined based on a target quantile fractile. If the replenishment attribute value is greater than a preset replenishment attribute threshold, the current to-be-processed item is determined to be a target to-be-processed item.

A fourth module is a result output module, which, for each target to-be-processed item, can input the replenishment attribute value of the current target to-be-processed item into a pre-obtained target inventory determination model to obtain a target replenishment quantity corresponding to the current target to-be-processed item. The target replenishment quantity can be determined based on the target inventory quantity and a net inventory quantity of the current target to-be-processed item. For example, if the net inventory quantity is greater than the target inventory quantity, there is no need to replenish it. If the net inventory quantity is less than the target inventory quantity, then the target replenishment quantity can be determined based on the difference between the target inventory quantity and the net inventory quantity.

In the technical solution of the embodiment of the present disclosure, the replenishment attribute value of each to-be-processed item can be determined based on the current time and the shipment quantity-associated information of each to-be-processed item. If there is a target to-be-processed item having a replenishment attribute value greater than a preset replenishment attribute threshold, the replenishment attribute value of the target to-be-processed item can be used as an input of the target inventory quantity determination model to determine a target inventory quantity corresponding to the target to-be-processed item, and further determine a target replenishment quantity based on the target inventory quantity and an existing net inventory quantity of the target to-be-processed item at the current time, which addresses the issue in related technologies that the inventory quantities of items are randomly determined or fixed, resulting in the determined replenishment quantity being mismatched with the actual required quantity, thus causing the issue of high inventory costs; and realizes the technical effects of determining the target replenishment quantity based on the shipment quantity-associated information of the to-be-processed item, improving the accuracy of determining the target replenishment quantity, effectively controlling inventory costs.

Figure 7:
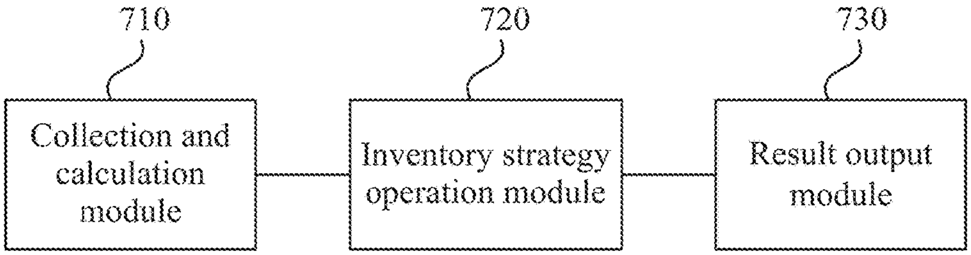
FIG. 7 is a schematic structural diagram of a business data processing apparatus according to an embodiment of the present disclosure.

FIG. 7 is a schematic structural diagram of a business data processing apparatus according to an embodiment of the present disclosure. As shown in FIG. 7, the apparatus includes: a collection and calculation module 710, an inventory strategy operation module 720, and a result output module 730.

The collection and calculation module 710 is configured to, for each to-be-processed item, determine a replenishment attribute value of a current to-be-processed item based on a current time and shipment quantity-associated information of the current to-be-processed item; the inventory strategy operation module 720 is configured to, in response to detecting that at least one target to-be-processed item whose replenishment attribute value is greater than a preset replenishment attribute threshold, determine a target inventory quantity of the at least one target to-be-processed item based on the replenishment attribute value of the at least one target to-be-processed item and a target inventory quantity determination model; the result output module 730 is configured to determine a target replenishment quantity of the target to-be-processed item based on the target inventory quantity and a net inventory quantity corresponding to the current time.

Based on the above technical solution, the shipment quantity-associated information includes a shipment date and a shipment quantity corresponding to the shipment date. The apparatus further includes a to-be-processed item determination module which is configured to, before determining the at least one to-be-processed item based on the shipment quantity-associated information of all items, further determine, based on shipment dates and shipment quantities corresponding to the shipment dates of each item, a shipment interval duration between consecutive two shipments of the respective item, and update the shipment interval duration to the shipment quantity-associated information of the respective item.

On the basis of the above technical solution, the to-be-processed item determination module is configured to, for the shipment quantity-associated information of each item, in response to detecting that the shipment quantities of a current item are greater than a preset shipment quantity threshold, determine shipment dates corresponding to the shipment quantities as to-be-processed shipment dates; and based on the to-be-processed shipment dates corresponding to each item, determine a shipment interval duration between consecutive two shipments of the respective item.

Based on the above technical solution, the apparatus further includes: a data preprocessing module configured to determine at least one to-be-processed item based on the shipment quantity-associated information of all items.

Based on the above technical solution, the data preprocessing module is further configured to:

determine a variation coefficient of each item based on at least one shipment interval duration corresponding to the respective item; and determine at least one to-be-processed item based on a preset variation coefficient threshold and all variation coefficients.

Based on the above technical solution, the data preprocessing module is configured to:

for the shipment interval duration of each item, determine an interval duration mean and an interval duration variance based on at least one shipment interval duration corresponding to a current item; and determine a variation coefficient of each item based on the interval duration mean and the interval duration variance corresponding to the respective item.

Based on the above technical solution, the data preprocessing module is configured to:

take an item having a variation coefficient less than the preset variation coefficient threshold as the to-be-processed item.

Based on the above technical solution, the collection and calculation module 710 is configured to:

determine a target data processing method based on shipment quantity-associated information of the current to-be-processed item; and process the current time and the shipment quantity-associated information based on the target data processing method to obtain a replenishment attribute value of the current to-be-processed item.

Based on the above technical solution, the collection and calculation module 710 is configured to:

determine at least one shipment interval duration based on shipment quantities corresponding to all shipment dates in the shipment quantity-associated information; if the at least one shipment interval duration satisfies a preset uniform distribution, determine the target data processing method to be a mean estimation method; and if the at least one shipment interval duration does not satisfy the preset uniform distribution, determine the target data processing method to be a quantile estimation method.

Based on the above technical solution, the collection and calculation module 710 is configured to:

determine a to-be-used shipment date in the shipment quantity-associated information that has a shipment quantity greater than a preset shipment quantity threshold and has a smallest interval duration from the current time; determine, based on the date corresponding to the current time and the to-be-used shipment date, a first duration; and process the first duration and the shipment quantity-associated information based on the target data processing method to obtain a replenishment attribute value of the current to-be-processed item.

Based on the above technical solution, the collection and calculation module 710 is configured to:

if the target data processing method is a mean estimation method, process the first duration and the interval duration variance determined based on the shipment interval durations based on the mean estimation method to determine a replenishment attribute value of the current to-be-processed item.

Based on the above technical solution, the collection and calculation module 710 is configured to:

if the target data processing method is a quantile estimation method, determine a target quantile sub-estimation method based on the shipment quantity-associated information and a preset quantile; and process the first duration and the shipment quantity-associated information based on the target quantile sub-estimation method to determine a replenishment attribute value of the current to-be-processed item.

Based on the above technical solution, the collection and calculation module 710 is configured to: if the preset quantile is less than or equal to the reciprocal of the number of shipments, determine the target quantile sub-estimation method to be a first quantile sub-estimation method; and if the preset quantile is greater than the reciprocal of the number of shipments, determine the target quantile sub-estimation method to be a second quantile sub-estimation method.

Based on the above technical solution, the collection and calculation module 710 is configured to:

if the target quantile sub-estimation method is the first quantile sub-estimation method, determine a replenishment attribute value of the current to-be-processed item based on the number of shipment interval days, a preset quantile, the number of shipments and the first duration.

Based on the above technical solution, the collection and calculation module 710 is configured to:

obtain a first data value based on the product of a minimum value of shipment interval durations, the preset quantile and the number of shipments; and determine a replenishment attribute value of the current to-be-processed item based on the ratio of the first duration to the first data value.

Based on the above technical solution, the collection and calculation module 710 is configured to:

if the target quantile sub-estimation method is the second quantile sub-estimation method, determine a target quantile based on the preset quantile and the shipment quantity-associated information; and determine a replenishment attribute value of the current to-be-processed item based on the target quantile and the first duration.

On the basis of the above technical solution, the collection and calculation module is further configured to: fit based on the numbers of shipment interval days in the shipment quantity-associated information to obtain a target empirical distribution; and determine the target quantile based on the preset quantile and the target empirical distribution.

Based on the above technical solution, the inventory strategy operation module 720 is configured to:

based on the target data processing method corresponding to each replenishment attribute value, determine a corresponding preset replenishment attribute threshold; and in response to detecting that at least one target to-be-processed item whose replenishment attribute value is greater than a corresponding preset replenishment attribute threshold, determine a target inventory quantity of the at least one target to-be-processed item based on the replenishment attribute value and a target inventory determination model.

Based on the above technical solution, the inventory strategy operation module 720 is configured to:

determine a target inventory quantity of the target to-be-processed item by taking the replenishment attribute value as an input parameter of the target inventory determination model.

In the technical solution of the embodiment of the present disclosure, the replenishment attribute value of each to-be-processed item can be determined based on the current time and the shipment quantity-associated information of each to-be-processed item. If there is a target to-be-processed item having a replenishment attribute value greater than a preset replenishment attribute threshold, the replenishment attribute value of the target to-be-processed item can be used as an input of the target inventory quantity determination model to determine a target inventory quantity corresponding to the target to-be-processed item, and further determine a target replenishment quantity based on the target inventory quantity and an existing net inventory quantity of the target to-be-processed item at the current time, which addresses the issue in related technologies that the inventory quantities of items are randomly determined or fixed, resulting in the determined replenishment quantity being mismatched with the actual required quantity, thus causing the issue of high inventory costs; and realizes the technical effects of determining the target replenishment quantity based on the shipment quantity-associated information of the to-be-processed item, improving the accuracy of determining the target replenishment quantity, effectively controlling inventory costs.

The apparatus for controlling item inventory according to the embodiments of the present disclosure can execute the method for controlling item inventory according to any embodiment of the present disclosure, and has corresponding functional modules for executing the method and can achieve corresponding effects to those achieved through the method.

The multiple units and modules included in the apparatus described above are divided only according to functional logic, but are not limited to the above-described divisions, as long as they can achieve the corresponding functions; in addition, the names of the multiple functional units are only for the convenience of distinguishing each other, and are not intended to limit the scope of protection of the embodiments of the present disclosure.

Figure 8:
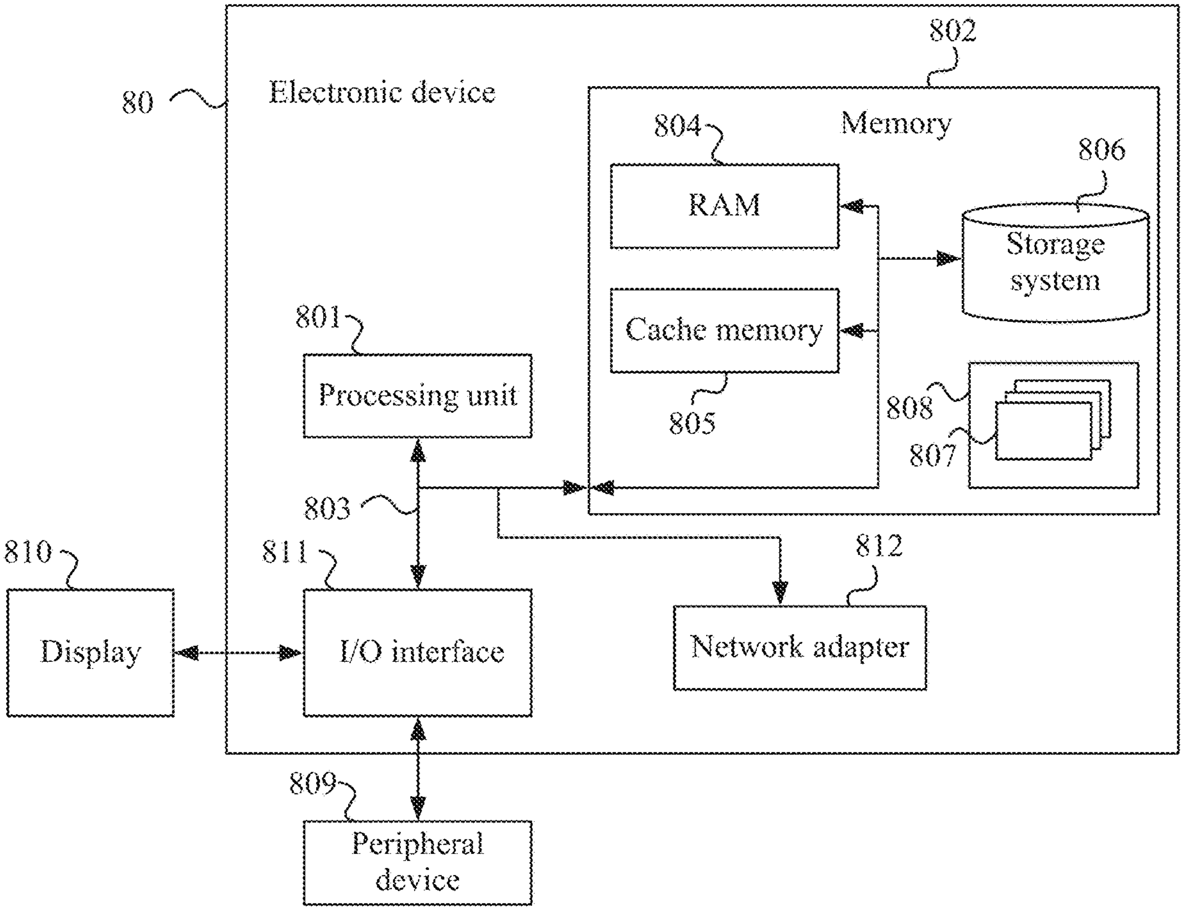
FIG. 8 is a schematic structural diagram of an electronic device according to an embodiment of the present disclosure.

FIG. 8 is a schematic structural diagram of an electronic device according to an embodiment of the present disclosure. FIG. 8 shows a block diagram of an electronic device 80 suitable for implementations of embodiments of the present disclosure as an example. The electronic device 80 shown in FIG. 8 is merely an example and should not be deemed as imposing any limitations on the functionality and scope of use of the embodiment of the present disclosure.

As shown in FIG. 8, the electronic device 80 is represented in the form of a general purpose computing apparatus. Components of the electronic device 80 may include, but are not limited to, one or more processors or processing units 801, a system memory 802 and a bus 803 connecting different system components (including the system memory 802 and the processing unit 801).

The bus 803 represents one or more of several types of bus structures, including a memory bus or a memory controller, a peripheral bus, a graphics acceleration port, a processor, or a local bus using any of a variety of bus structures. For example, these architectures include, but are not limited to, an industry standard architecture (ISA) bus, a micro channel architecture (MAC) bus, an enhanced ISA bus, a video electronics standards association (VESA) local bus, and a peripheral component interconnect (PCI) bus.

The electronic device 80 typically includes multiple types of computer system readable medium. These media may be any available medium that can be accessed by the electronic device 80. These media include a volatile medium, a non-volatile medium, a removable medium or a non-removable medium.

The system memory 802 may include a computer system-readable medium in the form of volatile memory, such as a random access memory (RAM) 804 and/or a cache memory 805. The electronic device 80 may include other removable/non-removable, volatile/non-volatile computer system storage medium. For example only, the storage system 806 may be configured to read and write a non-removable medium, or a non-volatile magnetic medium (not shown in FIG. 8, commonly referred to as a “hard drive”). Although not shown in FIG. 8, a magnetic disk drive configured to read and write a removable non-volatile magnetic disk (e.g., floppy disk) and an optical disk drive configured to read and write a removable non-volatile optical disk (e.g., a compact disc-read only memory, (CD-ROM), a digital video disk read-only memory (DVD-ROM), or other optical media) may be provided. In these cases, each drive may be connected to the bus 803 via one or more data media interfaces. The memory 802 may include at least one program product having a set of (e.g., at least one) program modules configured to perform the functions of the embodiments of the present disclosure.

A program/utility 808, having a set of (at least one) program modules 807, may be stored, for example, in the memory 802. Such program modules 807 include, but are not limited to, an operating system, one or more application programs, other program modules, or program data, any one or a combination of which may include an implementation of a network environment. The program modules 807 generally perform the described functions and/or methods in the embodiments of the present disclosure.

The electronic device 80 may communicate with one or more peripheral devices 809 (for example, a keyboard, a pointing terminal, or a display 810), may communicate with one or more terminals that enable a user to interact with the electronic device 80, and/or may communicate with any device (for example, a network interface controller or a modem) that enables the electronic device 80 to communicate with one or more other computing devices. Such communication may be performed through an input/output (I/O) interface 811. Further, the electronic device 80 may also communicate with one or more networks, such as a local area network (LAN), a wide area network (WAN), and/or a public network, such as the Internet, through a network adapter 812. As shown, a network adapter 812 communicates with other modules of the electronic device 80 via the bus 803. It is to be understood that although not shown in FIG. 8, other hardware and/or software modules may be used in conjunction with the electronic device 80. The other hardware and/or software modules include, but are not limited to, microcodes, a terminal driver, a redundant processing unit, an external disk drive array, a redundant arrays of independent disks (RAID) system, a tape driver, a data backup storage system and the like.

The processing unit 801 runs a program stored in the system memory 802, to execute multiple functional applications and perform data processing, for example, implementing the method for controlling item inventory according to any embodiment of the present disclosure.

A storage medium storing a computer-executable instruction is further provided according to an embodiment of the present disclosure, and the computer-executable instruction, when being executed by a computer processor, is used to perform the method for controlling item inventory. The method includes: for each to-be-processed item, determining a replenishment attribute value of a current to-be-processed item based on a current time and shipment quantity-associated information of the current to-be-processed item; in response to detecting that at least one target to-be-processed item whose replenishment attribute value is greater than a preset replenishment attribute threshold, determining a target inventory quantity of the at least one target to-be-processed item based on the replenishment attribute value of the at least one target to-be-processed item and a target inventory quantity determination model; and for each target to-be-processed item, determining a target replenishment quantity of a current target to-be-processed item based on the target inventory quantity and a net inventory quantity corresponding to the current time of the current target to-be-processed item.

The computer storage medium in embodiments of the present disclosure may be embodied as one computer-readable medium or any combination of multiple computer-readable media. The computer-readable medium may be a computer-readable signal medium or a computer-readable storage medium. The computer-readable storage medium may be, but is not limited to, an electrical, magnetic, optical, electromagnetic, infrared or semiconductor system, apparatus or component, or any combination thereof. Examples of computer-readable storage medium include (a non-exhaustive list): electrical connections having one or more wires, portable computer disks, hard disks, random access memories (RAMs), read-only memories (ROMs), erasable programmable read-only memories (EPROMs, or flash memories), optical fibers, portable compact disk read-only memories (CD-ROM), optical storage component, magnetic storage component, or any suitable combination thereof. Herein, the computer-readable storage medium may be any tangible medium including or storing a program. The program may be used by or used in conjunction with an instruction execution system, apparatus or component.

The computer-readable signal medium may include a data signal propagated in a baseband or a data signal propagated as part of a carrier. The data signal carries computer-readable program codes. The data signal may be propagated in multiple forms, which include but are not limited to, an electromagnetic signal, an optical signal, or any suitable combination thereof. The computer-readable signal medium may further be any computer-readable medium besides the computer-readable storage medium. The computer-readable medium can send, propagate, or transmit the program used by or used in conjunction with the instruction execution system, device, or component.

The program codes included in the computer-readable medium may be transmitted in any suitable medium, including, but not limited to, a wireless medium, a wired medium, an optical cable, radio frequency (RF), and the like, or any suitable combination thereof.

Computer program codes for performing the operations of the present disclosure may be written in one or more programming languages or a combination thereof, and the programming languages include object-oriented programming languages such as Java, Smalltalk, C++, and further include conventional procedural programming languages such as "C" programming language or similar programming languages. The program codes may be executed entirely on a user computer, may be executed partly on the user computer, may be executed as a stand-alone software package, may be executed partly on the user computer and partly on a remote computer, or may be executed entirely on the remote computer or a server. In a case involving a remote computer, the remote computer may be connected to the user's computer through any kinds of network, including a local area network (LAN) or a wide area network (WAN), or may be connected to an external computer (e.g., connected through Internet by using an Internet service provider).

What is claimed is:

1. A method for controlling item inventory, applied to at least one of a server and a terminal device, and comprising:

for each item of all items, determining, based on shipment dates and shipment quantities corresponding to the shipment dates of the item, a shipment interval duration between consecutive two shipments of the item, and updating the shipment interval duration to shipment quantity-associated information of the item, wherein the shipment quantity-associated information comprises the shipment dates and the shipment quantities;

determining at least one to-be-processed item from the all items based on shipment quantity-associated information of the all items, wherein each to-be-processed item of the at least one to-be-processed item is an item whose shipment frequency is less than a preset threshold;

for each to-be-processed item, determining a replenishment attribute value of the to-be-processed item based on a current time and the shipment quantity-associated information of the to-be-processed item, wherein the replenishment attribute value is used to represent urgency of replenishment of the to-be-processed item at the current time;

in response to the replenishment attribute value of the to-be-processed item being greater than a preset replenishment attribute threshold, determining the to-be-processed item as a target to-be-processed item, and determining a target inventory quantity of the target to-be-processed item based on the replenishment attribute value of the target to-be-processed item and a target inventory quantity determination model; and for the target to-be-processed item, determining a target replenishment quantity of the target to-be-processed item based on the target inventory quantity and a net inventory quantity corresponding to the current time of the target to-be-processed item;

wherein in a case where the shipment quantity-associated information comprises at least one shipment interval duration, the determining at least one to-be-processed item from the all items based on shipment quantity-associated information of the all items comprises:

for each item of the all items, determining a variation coefficient of the item based on the at least one shipment interval duration corresponding to the item, wherein the variation coefficient is used to represent fluctuation of the at least one shipment interval duration, and the at least one shipment interval duration and the shipment interval duration between the consecutive two shipments are comprised in a set of shipment interval days corresponding to the item; and determining the at least one to-be-processed item based on a preset variation coefficient threshold and the variation coefficient of the item;

wherein the determining a replenishment attribute value of the to-be-processed item based on a current time and the shipment quantity-associated information of the to-be-processed item comprises:

determining a target data processing method based on the shipment quantity-associated information of the to-be-processed item; and processing the current time and the shipment quantity-associated information based on the target data processing method to obtain the replenishment attribute value of the to-be-processed item;

wherein the determining a target data processing method based on the shipment quantity-associated information of the to-be-processed item comprises:

determining the at least one shipment interval duration based on shipment quantities corresponding to all shipment dates in the shipment quantity-associated information;

in a case where the at least one shipment interval duration satisfies a preset uniform distribution, determining the target data processing method to be a mean estimation method; and in a case where the at least one shipment interval duration does not satisfy the preset uniform distribution, determining the target data processing method to be a quantile estimation method.

2. The method according to claim 1, wherein the determining, based on shipment dates and shipment quantities corresponding to the shipment dates of the item, a shipment interval duration between consecutive two shipments of a respective item comprises:

in response to detecting that the shipment quantities of the item are greater than a preset shipment quantity threshold, determining shipment dates corresponding to the shipment quantities as to-be-processed shipment dates; and based on the to-be-processed shipment dates corresponding to the item, determining the shipment interval duration between the consecutive two shipments of the item.

3. The method according to claim 1, wherein the determining a variation coefficient of the item based on the at least one shipment interval duration corresponding to the comprises:

determining an interval duration mean and an interval duration variance based on the at least one shipment interval duration corresponding to the item; and determining the variation coefficient of the item based on the interval duration mean and the interval duration variance corresponding to the item.

4. The method according to claim 1 wherein the determining the at least one to-be-processed item based on a preset variation coefficient threshold and the variation coefficient of the item comprises:

in response to the variation coefficient of the item being less than the preset variation coefficient threshold, taking the item as a to-be-processed item.

5. The method according to claim 1, wherein the processing the current time and the shipment quantity-associated information based on the target data processing method to obtain the replenishment attribute value of the to-be-processed item comprises:

determining a to-be-used shipment date from the shipment dates in the shipment quantity-associated information that has a smallest interval duration from the current time, wherein a shipment quantity corresponding to the to-be-used shipment date is greater than a preset shipment quantity threshold;

determining, based on a date corresponding to the current time and the to-be-used shipment date, a first duration; and processing the first duration and the shipment quantity-associated information based on the target data processing method to obtain the replenishment attribute value of the current to-be-processed item.

6. The method according to claim 5, wherein, in the case where the shipment quantity-associated information comprises the at least one shipment interval duration, the processing the first duration and the shipment quantity-associated information based on the target data processing method to obtain the replenishment attribute value of the current to-be-processed item, comprises:

in a case where the target data processing method is the mean estimation method, processing the first duration and interval duration variance determined according to the at least one shipment interval duration based on the mean estimation method to determine a replenishment attribute value of the to-be-processed item.

7. The method according to claim 5, wherein the processing the first duration and the shipment quantity-associated information based on the target data processing method to obtain the replenishment attribute value of the to-be-processed item comprises:

in a case where the target data processing method is the quantile estimation method, determining a target quantile sub-estimation method based on the shipment quantity-associated information and a preset quantile; and processing the first duration and the shipment quantity-associated information based on the target quantile sub-estimation method to determine the replenishment attribute value of the to-be-processed item.

8. The method according to claim 7, wherein the shipment quantity-associated information comprises a number of shipments corresponding to the at least one shipment interval duration, and the determining a target quantile sub-estimation method based on the shipment quantity-associated information and a preset quantile comprises:

in a case where the preset quantile is less than or equal to a reciprocal of the number of shipments, determining the target quantile sub-estimation method to be a first quantile sub-estimation method; and in a case where the preset quantile is greater than the reciprocal of the number of shipments, determining the target quantile sub-estimation method to be a second quantile sub-estimation method.

9. The method according to claim 8, wherein the processing the first duration and the shipment quantity-associated information based on the target quantile sub-estimation method to determine the replenishment attribute value of the to-be-processed item comprising:

in a case where the target quantile sub-estimation method is the first quantile sub-estimation method, determining the replenishment attribute value of the to-be-processed item based on the at least one shipment interval duration, the preset quantile, the number of shipments and the first duration.

10. The method according to claim 9, wherein the determining the replenishment attribute value of the to-be-processed item based on the at least one shipment interval duration, the preset quantile, the number of shipments and the first duration comprises:

obtaining a first data value based on a product of a minimum value of the at least one shipment interval duration, the preset quantile and the number of shipments; and determining the replenishment attribute value of the to-be-processed item based on a ratio of the first duration to the first data value.

11. The method according to claim 8, wherein the processing the first duration and the shipment quantity-associated information based on the target quantile sub-estimation method to determine the replenishment attribute value of the to-be-processed item comprises:

in a case where the target quantile sub-estimation method is the second quantile sub-estimation method, determining a target quantile fractile based on the preset quantile and the shipment quantity-associated information; and determining the replenishment attribute value of the to-be-processed item based on the target quantile fractile and the first duration.

12. The method according to claim 11, wherein the determining a target quantile fractile based on the preset quantile and the shipment quantity-associated information comprises:

fitting based on the at least one shipment interval duration in the shipment quantity-associated information to obtain a target empirical distribution; and determining the target quantile fractile based on the preset quantile and the target empirical distribution.

13. The method according to claim 1, wherein the in response to the replenishment attribute value of the to-be-processed item being greater than a preset replenishment attribute threshold, determining the to-be-processed item as a target to-be-processed item, the determining a target inventory quantity of the target to-be-processed item based on the replenishment attribute value of the target to-be-processed item and a target inventory determination model comprises:

based on the target data processing method corresponding to the replenishment attribute value, determining the preset replenishment attribute threshold; and in response to the replenishment attribute value of the to-be-processed item being greater than a preset replenishment attribute threshold, determining the to-be-processed item as the target to-be-processed item, determining the target inventory quantity of the target to-be-processed item based on the replenishment attribute value and the target inventory determination model.

14. The method according to claim 13, wherein the determining the target inventory quantity of the target to-be-processed item based on the replenishment attribute value and the target inventory determination model comprises:

determining the target inventory quantity of the target to-be-processed item by taking the replenishment attribute value as an input parameter of the target inventory determination model.

15. An electronic device, comprising:

at least one processor; and a storage apparatus configured to store at least one program, wherein the at least one program, when being executed by the at least one processor, causes the at least one processor to implement a method for controlling item inventory, the electronic device comprises at least one of a server and a terminal device;

wherein the method for controlling item inventory comprises:

for each item of all items, determining, based on shipment dates and shipment quantities corresponding to the shipment dates of the item, a shipment interval duration between consecutive two shipments of the item, and updating the shipment interval duration to shipment quantity-associated information of the item, wherein the shipment quantity-associated information comprises the shipment dates and the shipment quantities;

determining at least one to-be-processed item from the all items based on shipment quantity-associated information of the all items, wherein each to-be-processed item of the at least one to-be-processed item is an item whose shipment frequency is less than a preset threshold;

for each to-be-processed item of the at least one to-be-processed item, determining a replenishment attribute value of the to-be-processed item based on a current time and shipment quantity-associated information of the to-be-processed item, wherein the replenishment attribute value is used to represent urgency of replenishment of the to-be-processed item at the current time;

in response to the replenishment attribute value of the to-be-processed item being greater than a preset replenishment attribute threshold, determining the to-be-processed item as a target to-be-processed item, and determining a target inventory quantity of the target to-be-processed item based on the replenishment attribute value of the target to-be-processed item and a target inventory quantity determination model; and for the target to-be-processed item, determining a target replenishment quantity of the target to-be-processed item based on the target inventory quantity and a net inventory quantity corresponding to the current time of the target to-be-processed item;

wherein in a case where the shipment quantity-associated information comprises at least one shipment interval duration, the determining at least one to-be-processed item from the all items based on shipment quantity-associated information of the all items comprises:

for each item of the all items, determining a variation coefficient of the item based on the at least one shipment interval duration corresponding to the item, wherein the variation coefficient is used to represent fluctuation of the at least one shipment interval duration, and the at least one shipment interval duration and the shipment interval duration between the consecutive two shipments are comprised in a set of shipment interval days corresponding to the item; and determining the at least one to-be-processed item based on a preset variation coefficient threshold and the variation coefficient of the item;

wherein the determining a replenishment attribute value of the to-be-processed item based on a current time and the shipment quantity-associated information of the to-be-processed item comprises:

determining a target data processing method based on the shipment quantity-associated information of the to-be-processed item; and processing the current time and the shipment quantity-associated information based on the target data processing method to obtain the replenishment attribute value of the to-be-processed item;

wherein the determining a target data processing method based on the shipment quantity-associated information of the to-be-processed item comprises:

determining the at least one shipment interval duration based on shipment quantities corresponding to all shipment dates in the shipment quantity-associated information;

in a case where the at least one shipment interval duration satisfies a preset uniform distribution, determining the target data processing method to be a mean estimation method; and in a case where the at least one shipment interval duration does not satisfy the preset uniform distribution, determining the target data processing method to be a quantile estimation method.

16. A non-transitory storage medium storing a computer-executable instruction, wherein the computer-executable instruction, when being executed by a computer processor of at least one of a server and a terminal device, is used to perform a method for controlling item inventory;

wherein the method for controlling item inventory comprises:

for each item of all items, determining, based on shipment dates and shipment quantities corresponding to the shipment dates of the item, a shipment interval duration between consecutive two shipments of the item, and updating the shipment interval duration to shipment quantity-associated information of the item, wherein the shipment quantity-associated information comprises the shipment dates and the shipment quantities;

determining at least one to-be-processed item from the all items based on shipment quantity-associated information of the all items, wherein each to-be-processed item of the at least one to-be-processed item is an item whose shipment frequency is less than a preset threshold;

for each to-be-processed item of the at least one to-be-processed item, determining a replenishment attribute value of the to-be-processed item based on a current time and shipment quantity-associated information of the to-be-processed item, wherein the replenishment attribute value is used to represent urgency of replenishment of the to-be-processed item at the current time;

in response to the replenishment attribute value of the to-be-processed item being greater than a preset replenishment attribute threshold, determining the to-be-processed item as a target to-be-processed item, and determining a target inventory quantity of the target to-be-processed item based on the replenishment attribute value of the target to-be-processed item and a target inventory quantity determination model; and for the target to-be-processed item, determining a target replenishment quantity of the target to-be-processed item based on the target inventory quantity and a net inventory quantity corresponding to the current time of the target to-be-processed item;

wherein in a case where the shipment quantity-associated information comprises at least one shipment interval duration, the determining at least one to-be-processed item from the all items based on shipment quantity-associated information of the all items comprises:

for each item of the all items, determining a variation coefficient of the item based on the at least one shipment interval duration corresponding to the item, wherein the variation coefficient is used to represent fluctuation of the at least one shipment interval duration, and the at least one shipment interval duration and the shipment interval duration between the consecutive two shipments are comprised in a set of shipment interval days corresponding to the item; and determining the at least one to-be-processed item based on a preset variation coefficient threshold and the variation coefficient of the item;

wherein the determining a replenishment attribute value of the to-be-processed item based on a current time and the shipment quantity-associated information of the to-be-processed item comprises:

determining a target data processing method based on the shipment quantity-associated information of the to-be-processed item; and processing the current time and the shipment quantity-associated information based on the target data processing method to obtain the replenishment attribute value of the to-be-processed item;

wherein the determining a target data processing method based on the shipment quantity-associated information of the to-be-processed item comprises:

determining the at least one shipment interval duration based on shipment quantities corresponding to all shipment dates in the shipment quantity-associated information;

in a case where the at least one shipment interval duration satisfies a preset uniform distribution, determining the target data processing method to be a mean estimation method; and in a case where the at least one shipment interval duration does not satisfy the preset uniform distribution, determining the target data processing method to be a quantile estimation method.

* * * * *